United States Patent
Richardson et al.

(10) Patent No.: US 6,687,787 B1
(45) Date of Patent: Feb. 3, 2004

(54) CONFIGURATION OF A DATA STORAGE SYSTEM

(75) Inventors: Derek Keith Richardson, Shrewsbury, MA (US); James P. Rowland, Holliston, MA (US)

(73) Assignee: EMC Corporation, Hopkinton, MA (US)

( * ) Notice: Subject to any disclaimer, the term of this patent is extended or adjusted under 35 U.S.C. 154(b) by 434 days.

(21) Appl. No.: 09/800,091

(22) Filed: Mar. 5, 2001

(51) Int. Cl.[7] ............................................. G06F 12/00
(52) U.S. Cl. ......................... 711/114; 709/105; 714/7
(58) Field of Search ........................ 711/114, 111–112, 711/170; 709/105, 223; 714/1–7

(56) References Cited

U.S. PATENT DOCUMENTS

| | | | | |
|---|---|---|---|---|
| 4,633,387 A | * | 12/1986 | Hartung et al. | 709/105 |
| 5,239,649 A | * | 8/1993 | McBride et al. | 709/105 |
| 6,092,169 A | * | 7/2000 | Murthy et al. | 711/170 |
| 6,209,059 B1 | * | 3/2001 | Ofer et al. | 711/114 |
| 6,317,808 B1 | * | 11/2001 | Berenshteyn | 711/112 |
| 6,405,284 B1 | * | 6/2002 | Bridge | 711/114 |
| 6,430,611 B1 | * | 8/2002 | Kita et al. | 709/223 |
| 6,487,634 B1 | * | 11/2002 | Bachmat | 711/112 |
| 6,535,954 B2 | * | 3/2003 | Obara et al. | 711/114 |

* cited by examiner

Primary Examiner—Nasser Moazzami
(74) Attorney, Agent, or Firm—Fish & Richardson P.C.

(57) ABSTRACT

A computer-implemented method for automatically configuring a data-storage system includes receiving a specification of mass-storage elements to be incorporated into the data-storage system and identifying installed resources of the data-storage system that are available for sharing among the mass-storage elements. The mass-storage elements are then mapped to a subset of the installed resources. This subset is selected to equalize the additional load on the installed resources that arise as a result of incorporating the additional mass-storage elements into the data-storage system.

19 Claims, 7 Drawing Sheets

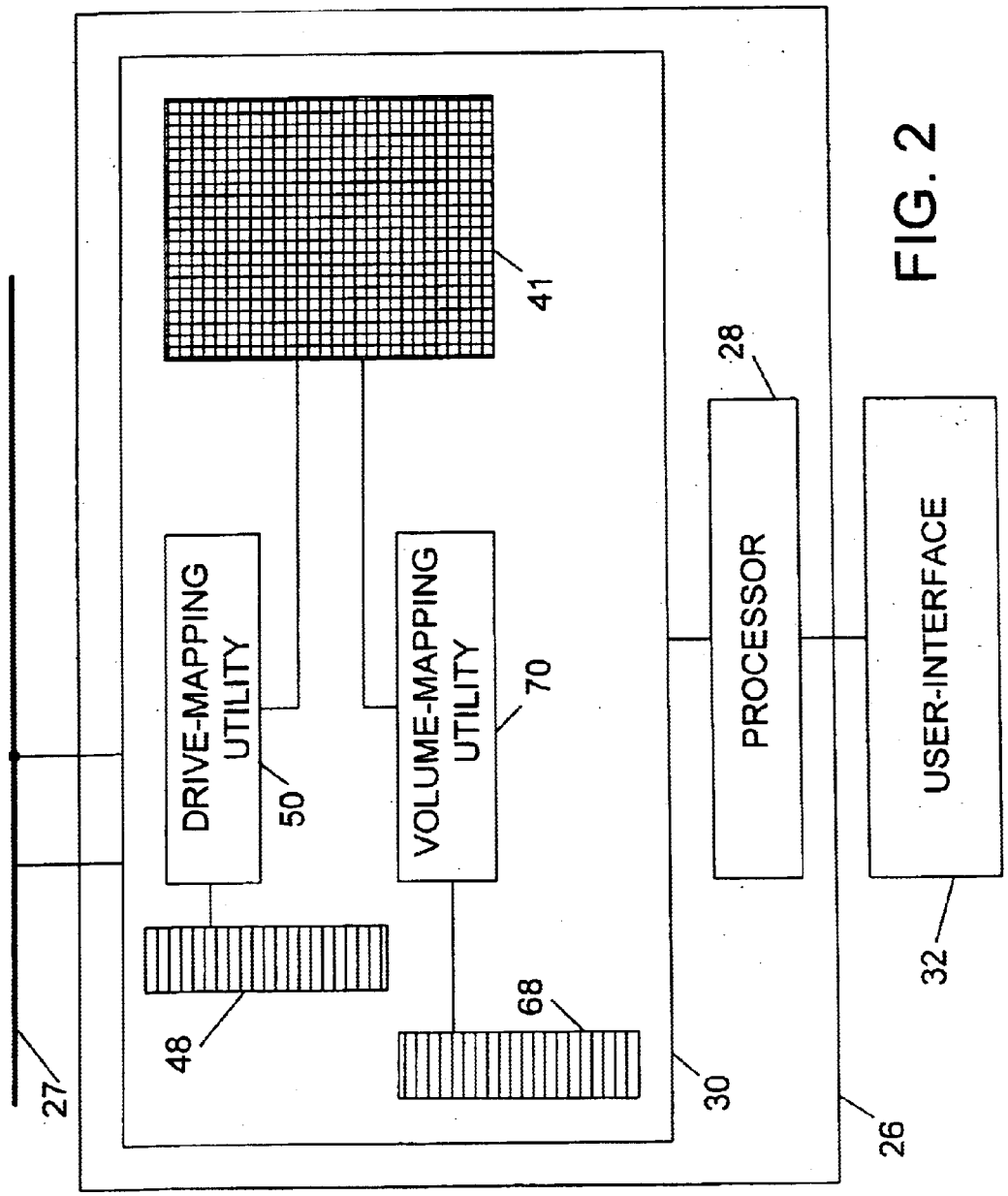

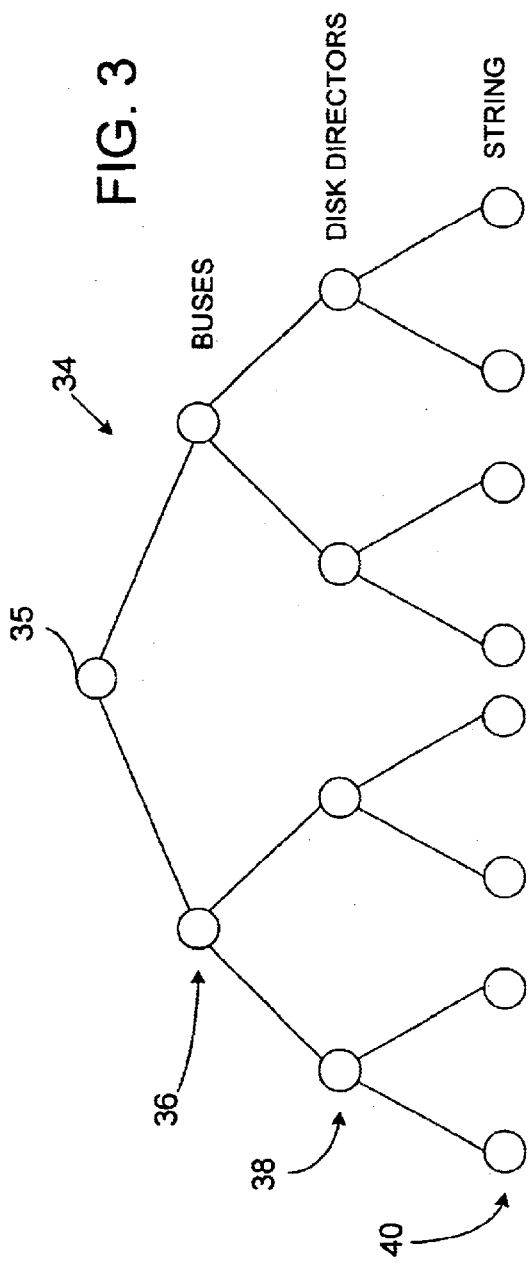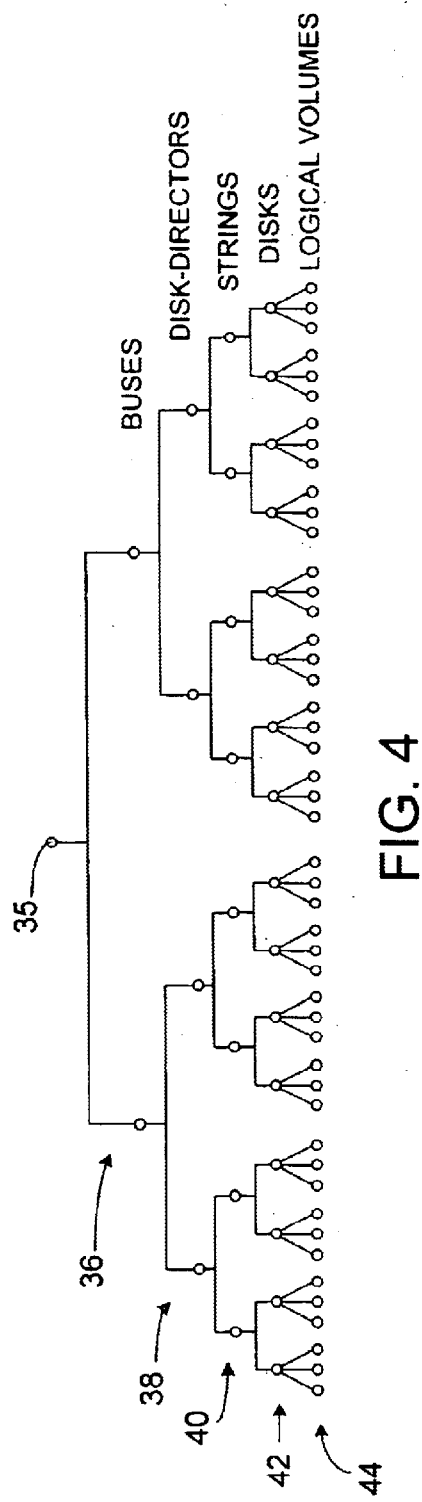

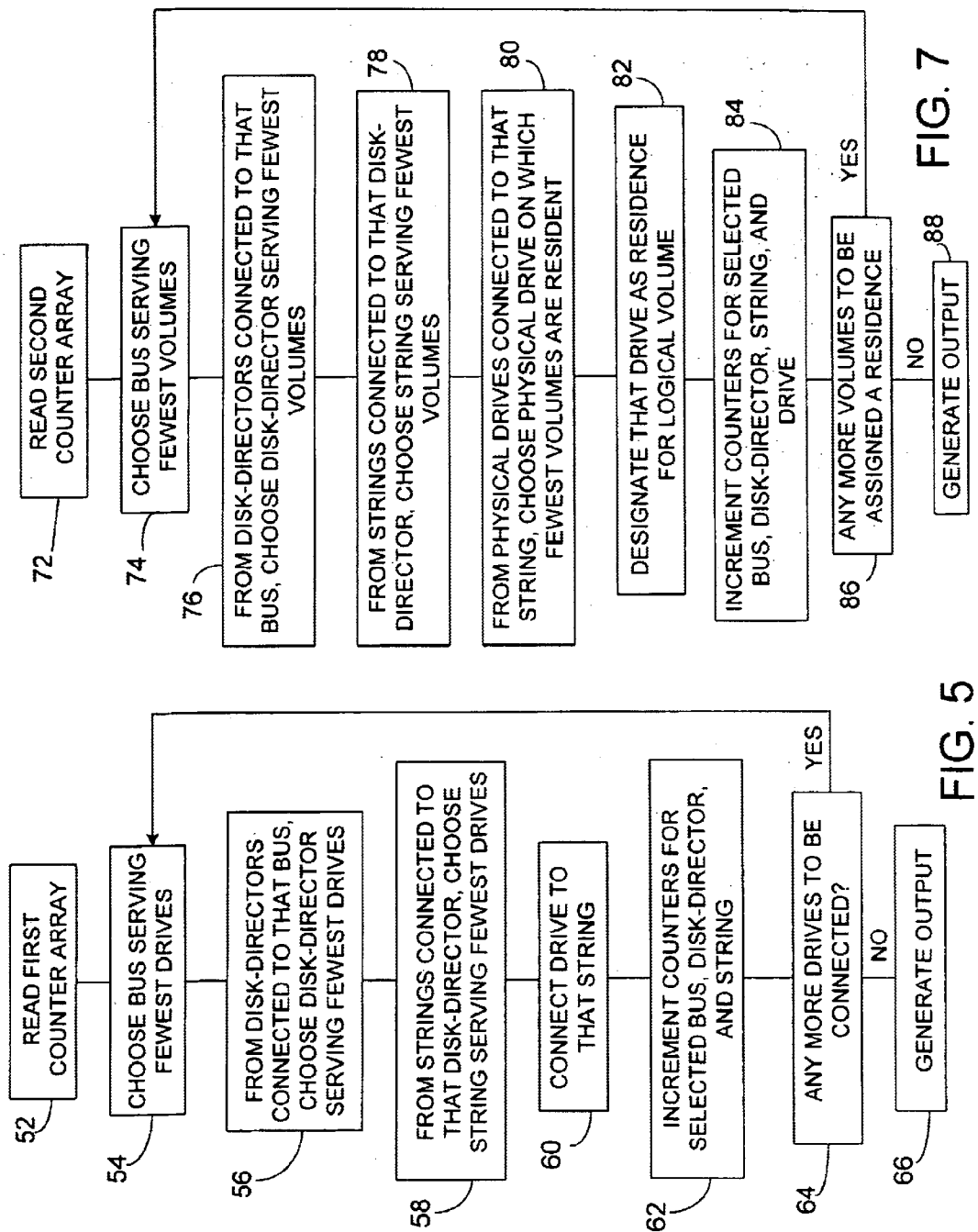

16 disks 24 vols DA-01a:CD Cuda-181 3 hypers 86% or 121B03c1 blocks free 512 fmt

| Hyper | Vol | Type | Emul |
|---|---|---|---|
| 0 | 00 | M1 | 3390-9 |
| 1 | 08 | M2 | 3390-9 |
| 2 | 10 | M1 | 3390-9 |

| ID | Name | Blocks | Fmt520 | XOR | Spare | Group |
|---|---|---|---|---|---|---|
| A | Cuda-181 | 151EC5EA | NO | NO | NO | 0 |
| B | New-Type | | | | | |

FIG. 6

| PHYSICAL DISK (22) | DISK DETECTOR (16) | BUS (18) | STRING (20) | DISK POSITION ON STRING | FIRST LOGICAL VOLUME ON PHYSICAL (46) | | SECOND LOGICAL VOLUME ON PHYSICAL (46) | | THIRD LOGICAL VOLUME ON PHYSICAL (46) | |
|---|---|---|---|---|---|---|---|---|---|---|
| | | | | | MIRROR 1 | MIRROR 2 | MIRROR 1 | MIRROR 2 | MIRROR 1 | MIRROR 2 |
| 01 (22A) | 1A (16A) | 1 (18A) | 1 (20A) | 0 | 000 | | | 008 | | 010 |
| 02 (22B) | 2B (16D) | 2 (18B) | 1 (20B) | 0 | | 000 | 008 | | 010 | |
| 03 (22C) | 1B (16B) | 1 (18A) | 1 (20C) | 0 | 001 | | | 009 | | 011 |
| 04 (22D) | 2A (16C) | 2 (18B) | 1 (20D) | 0 | | 001 | 009 | | 011 | |
| 05 (22E) | 1A (16A) | 1 (18A) | 2 (20E) | 0 | 002 | | | 00A | | 012 |
| 06 (22F) | 2B (16D) | 2 (18B) | 2 (20F) | 0 | | 002 | 00A | | 012 | |
| 07 (22G) | 1B (16B) | 1 (18A) | 2 (20G) | 0 | 003 | | | 00B | | 013 |
| 08 (22H) | 2A (16C) | 2 (18B) | 2 (20H) | 0 | | 003 | 00B | | 013 | |
| 09 (22I) | 1A (16A) | 1 (18A) | 1 (20A) | 1 | 004 | | | 00C | | 014 |
| 10 (22J) | 2B (16D) | 2 (18B) | 1 (20B) | 1 | | 004 | 00C | | 014 | |
| 11 (22K) | 1B (16B) | 1 (18A) | 1 (20C) | 1 | 005 | | | 00D | | 015 |
| 12 (22L) | 2A (16C) | 2 (18B) | 1 (20D) | 1 | | 005 | 00D | | 015 | |
| 13 (22M) | 1A (16A) | 1 (18A) | 2 (20E) | 1 | 006 | | | 00E | | 016 |
| 14 (22N) | 2B (16D) | 2 (18B) | 2 (20F) | 1 | | 006 | 00E | | 016 | |
| 15 (22O) | 1B (16B) | 1 (18A) | 2 (20G) | 1 | 007 | | | 00F | | 017 |
| 16 (22P) | 2A (16C) | 2 (18B) | 2 (20H) | 1 | | 007 | 00F | | 017 | |

FIG. 9

CONFIGURATION OF A DATA STORAGE SYSTEM

BACKGROUND

To a user, a data-storage system appears as a collection of volumes for storing data. A user who requests that data be stored in a particular volume often has the illusion that that data is being written to a particular physical disk.

In fact, what a user considers to be a volume may not correspond to a physical disk. In most cases, the volume is a logical volume that may occupy only a portion of a single physical disk drive. In some cases, for example when a logical volume is mirrored onto two or more physical disk drives, there is no one to one mapping between a volume and a physical drive.

The distribution, or mapping, of logical volumes onto actual physical disks has significant impact on the performance of the data-storage system. For example, when a logical volume is mirrored, each write to that volume requires a write operation to at least two physical disks. If a logical volume and its mirror were to reside on the same physical disk, then each write to that logical volume would trigger contention for the single write head associated with that disk. As a result, the two write operations required to mirror a logical volume would have to be done serially.

The problem of contention arises not just in connection with the sharing of a physical disk. Contention can arise in connection with all hardware resources. For example, if a logical volume and its mirror were on two different disks but both disks shared the same bus, there would be contention for that bus. To the extent that two logical volumes share any hardware resource of the data processing system, there exists a possibility of contention for that hardware resource.

The process of configuring the data-storage system includes the allocation of hardware resources to various logical volumes. Because of the large number of logical volumes in a typical installation, this is typically a lengthy and error prone process performed by a field service technician following delivery of the data-storage system.

SUMMARY

The invention provides a computer-implemented method for automatically configuring a data-storage system with a minimum of intervention by field-service personnel. The method includes receiving a specification of mass-storage elements that are to be incorporated into the data-storage system. These mass-storage elements can be physical elements, such as physical disks. Alternatively, the mass-storage elements can be logical elements such as logical volumes that reside on physical disks.

Each data-storage system includes installed resources that are available for sharing among the mass-storage elements that are to be incorporated into the data-storage system. The automated configuration method identifies these installed resources and maps each mass-storage element onto a subset of the installed resources. This subset is selected so as to balance the additional load imposed on the installed resources as a result of incorporating the additional mass-storage elements into the data-storage system. In an optional step, the resulting subset of installed resources is displayed.

In one aspect of the invention, mapping each of the mass-storage elements to a subset of the installed resources includes selecting the subset of installed resources to minimize an extent to which any two mass-storage elements share a common resource.

According to one specific architecture, identifying the installed resources includes identifying a plurality of system buses available for carrying data to and from a mass-storage element. In such a case, identifying the installed resources also includes identifying a plurality of disk directors available for controlling data communication between a mass-storage element and the data-storage system, each of the disk directors being connected to one of the system buses. The identification of installed resources can also include the identification of strings associated with the disk directors, each of the strings being available for mounting a mass-storage element.

In one aspect of the invention, the identification of installed resources includes classifying the installed resources into a plurality of resource classes, In such a case, allocating a subset of the installed resources to each of the mass-storage elements includes selecting the subset to minimize an extent to the mass-storage elements share installed resources within a resource class.

These and other features of the invention will be apparent from the following detailed description and the accompanying figures, in which:

BRIEF DESCRIPTION OF THE FIGURES

FIG. 2 is a detailed view of the service director of the data-storage system in FIG. 1;

FIG. 3 is a tree representing the available resources associated with the data-storage system of FIG. 1;

FIG. 4 shows the tree of FIG. 3 with additional nodes corresponding to physical disks and logical volumes;

FIG. 5 shows a method for distributing physical disks among installed resources of the data-storage system;

FIG. 6 shows representative graphical output of software for implementing the configuration system for allocating installed resources to physical disks;

FIG. 7 shows a method for distributing logical volumes among installed resources of the data-storage system;

FIG. 9 shows a sequence for allocation of logical volumes among resources available in the data-storage system of FIG. 1.

DETAILED DESCRIPTION

Figure 1:
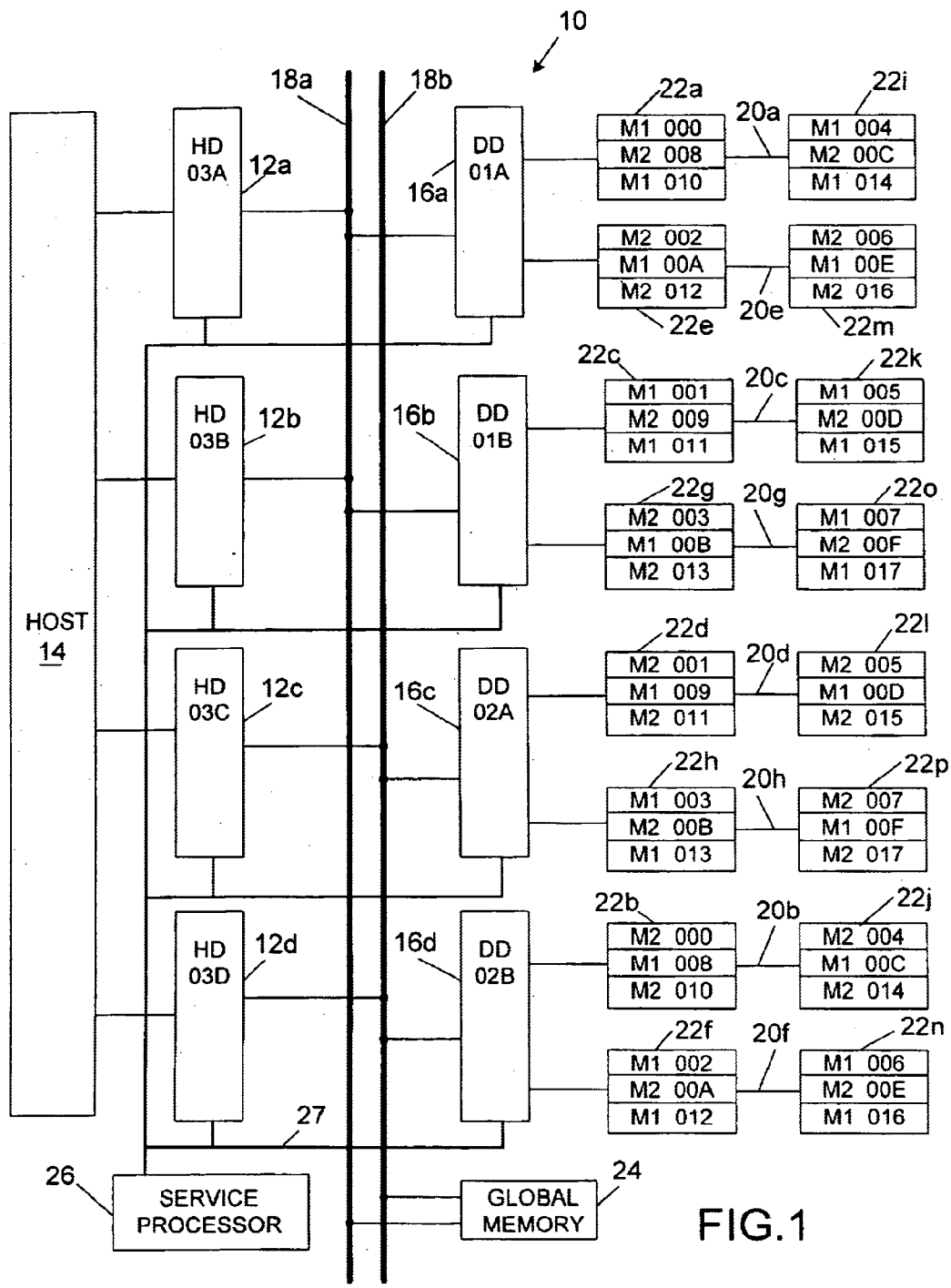
FIG. 1 is a data-storage system incorporating the configuration system of the invention.

A data-storage system 10 to be configured includes several host directors 12, of which one is shown in FIG. 1. The host director 12 is a processing element through which a host 14 issues read and write requests to the data-storage system 10. The host director 12 communicates these read and write requests to a disk director 16a–d through a connection to one of a first and second system bus 18a–b.

Each disk director 16a is a processing element through which the data-storage system 10 reads and writes data to physical disks. Each disk director 16a also includes a pair of disk buses 20a–e for connection to one or more physical disks 22a, 22e, 22i, 22m. To avoid any confusion with the system bus, the term "string" is used to refer to a disk bus 20a–b throughout the remainder of this specification. The term "bus" is intended to refer to the system bus 18a–b.

Throughout this specification, the term "disk" is used to refer to the mass-storage elements connected to the data-storage system 10. This is only because magnetic disks are a preferred mass-storage element. It is understood, however, that mass-storage elements other than disks are within the scope of the invention.

The host director 12 does not communicate directly with any disk director 16a–d. Instead, both the host director 12 and the disk directors 16a–d share access to a common memory 24 connected to both the first and second buses 18a, 18b. This common memory 24 provides a repository for the temporary storage of data and for the posting messages between host directors 12 and disk directors 16a–d.

In a typical write operation, the host director 12 will store the data in the common memory 24, together with a message indicating that this data is to be stored on a physical disk 22. The host director 12 then sends an acknowledgment to the host 14 indicating that the write operation was successful. Meanwhile, the disk directors 16a–d, which are constantly scanning the common memory 24, identify data that must be written to a disk 22a–p and carry out the more time-consuming task of doing so.

By separating the write operation into a fast write operation from the host director 12 to the common memory 24 and a slower write operation from the common memory 24 to the physical disk 22a–p, the data-storage system 10 reduces the host's perception of latency. Although the overall latency remains the same, the time-consuming portion of the write operation is carried out asynchronously by a disk director 16 without the awareness of the host 14.

Each access to a particular disk 22a requires that several shared hardware resources be temporarily dedicated to carrying out that access. These hardware resources include the particular disk 22a itself, the string 20a to which that disk is connected, the disk director 16a to which that string is connected, and the bus 18a through which that disk director 16a communicates with the common memory 24. As a result, access to a particular disk 22a precludes other operations that require access those same hardware resources. This contention for installed hardware resources tends to degrade performance of the data-storage system 10.

Proper configuration of the data-storage system 10 reduces the likelihood of contention for hardware resources. This configuration process is carried out by field service personnel communicating with the data-storage system 10 through a service processor 26 that communicates with the each disk director 16a–d through a configuration-data path 27.

The service processor 26, shown in more detail in FIG. 2, includes a processing element 28 in communication with a memory 30, in which is maintained certain data structures to be discussed in more detail below. The service processor 26 also includes a user-interface 32, such as a keyboard and monitor, through which field service personnel can issue commands to control the configuration of the data-storage system 10.

Referring to FIG. 3, the installed hardware resources of the data-storage system 10 shown in FIG. 1 can be viewed as an installed-resource tree 34 having different levels of nodes. The root node 35 corresponds to the system itself. The first node level 36 corresponds to the buses 18a–b. A node representative of a bus 18a is, in turn, connected to nodes in a second node level 38, each of which is representative of a disk director 16a, 16c connected to that system bus 18a. Finally, a node representative of a disk director 16a is connected to nodes in a third node level 40. Each node in the third node level 40 represents a string 20a, 20e associated with that disk director 16a.

It will be appreciated that different architectures of installed resources can result in different installed-resource trees 34. For example, a data-storage system 10 having three or more buses can be represented by including additional nodes for each system bus in the first node level 36. Disk directors having different numbers of strings can likewise be represented by changing the number of nodes 38 associated with each disk director 16a–d. The installed-resource tree 34 for the data-storage system 10 is represented in a resource database 41 maintained in the memory 30 of the service processor 26 and stored in each disk director 16a–d.

The process of configuring the data-storage system 10 includes connecting physical disks 22a–p to the available strings 20a–20h, and then assigning logical volumes 46 to the physical disks 22a–p. In the context of FIG. 3, this is equivalent to adding a fourth node level 42 in which each node corresponds to a physical disk 22a–d, and a fifth node level 44 in which each node corresponds to a logical volume 46, as shown in FIG. 4.

The choice of which string serves a physical disk can affect the overall performance of the data-storage system. For example, if all physical disks were to be served by the same string, then there would be unnecessary contention for that string. If the physical disks were evenly distributed across the strings but all the strings were served by the same disk director, there would be unnecessary contention for that disk director. Similarly, if the physical disks were served by different disk directors, but all the disk directors were served by the same bus, there would be unnecessary contention for that bus.

Referring back to FIG. 2, a first counter array 48 maintained in the memory 30 of the service processor 26 indicates the number of physical disks 22a–p being served by each resource listed in the resource database 41. The first counter array 48 is updated as physical disks 22a–p are added to or removed from the data-storage system 10. The first counter array 48 includes a string-counter for each string 20a, the value of which indicates the number of disks 22a, 22i connected to that string, a disk-director-counter for each disk director 16a, the value of which is the sum of the string-counters of all strings 20a, 20e connected to that disk director 16a, and a bus-counter for each bus 18a, the value of which is the sum of the disk-director-counters for all disk directors 16a, 16b connected to that bus 18a.

For a given set of physical disks, a disk-mapping utility 50 executed by the service processor 26 maps the physical disks 22a–p onto the available strings 20a–h so as to equally distribute the load borne by all the installed hardware resources of the system. FIG. 5 summarizes the method carried out by the disk-mapping utility 50 in assigning a physical disk to a string.

Referring to FIG. 5, the disk-mapping utility begins by reading 52 the first counter array and inspecting the bus-counters to identify and select 54 the bus that serves the fewest physical disks. Having selected a bus, the disk-mapping utility inspects the disk-director-counters associated with that selected bus to identify and select 56 the disk director on that bus that serves the fewest disks. Finally, the disk-mapping utility inspects the string-counters associated with the selected disk director to identify and select 58 the string that W serves the fewest disks. The disk-mapping utility then selects 60 that string. The disk-mapping utility then updates 62 the counters for a subset of installed resources that are selected to service the the disk. The disk-mapping utility then determines 64 whether there are additional disks to be assigned resources. If so, the disk-mapping utility repeats the foregoing process. Otherwise, the disk-mapping utility generates 66 output for inspection by field-service personnel.

The net result of the above disk-mapping process is a configuration in which the number of disks serviced by any one resource differs from the number of disks serviced by any other resource by no more than one. For example, in a properly configured data-storage system 10, if a particular disk director services n disks, then all other disk directors will service either n, n+1, or n−1 disks. An analogous statement can be made for the buses and the strings on a properly configured data-storage system 10.

FIG. 6 is an exemplary output of the disk-mapping utility 50 showing the string that each disk is to be connected to. In the exemplary output, there are four available disk directors, of which two are connected to the first bus and two are connected to the second bus. Each disk director has two strings, each of which is represented as a column on the chart. The six rows on the chart indicate that each string can accommodate up to six physical disks. The disk-configuration utility has indicated that sixteen disks of type "A" (identified at the bottom of the chart) are preferably distributed across the eight available strings so that each string services two disks. Had the number of disks to be mapped not been a multiple of the number of available strings, one or more strings would service fewer disks than other strings. However, the disk-mapping utility 50 would nevertheless ensure that the difference between the number of disks serviced by any two strings is no greater than one.

The foregoing method assumes that each additional disk imposes the same load on all the resources that service it. However, this may not be the case. For example, certain disks may be larger than others and may therefore be accessed more frequently. Or, certain disks may have larger latencies than others as a result of their mechanical construction. When this is the case, the optimal allocation of resources to disks may be such that the difference between the number of disks serviced by any two resources can differ by more than one.

A configuration in which the disks do not impose a uniform load on each resource can readily be accommodated by noting that the counter associated with any one resource is, in effect, a measure of the total load imposed by all disks on a particular resource. If all disks are assumed to impose the same load on the resource, then the counter is always incremented by the same amount whenever that resource is assigned to service one additional disk.

In an alternative embodiment, in which some disks impose a greater load on a resource than other disks, each disk can be assigned a weight relative to the other disks. The counters can then be incremented according to the relative weights of the disks. For example, if a disk having a particularly high latency is to be serviced by a particular disk director 16, then the corresponding disk-director-counter would be incremented by a larger value than it would have been had that disk been a faster disk. The disk-mapping utility 50 would then implement an optimization algorithm that minimizes the overall expected latency of the data-storage system 10.

In other cases, it may be more important to equalize the load borne by some resources at the expense of the loads borne by other resources. For example, because the buses are constantly in use by disk directors and host directors 12, it can be of particular importance to split the load evenly across buses, even if doing so were to require that certain disk directors or certain strings service more than their fair share of the disks.

In another embodiment, this can be achieved by appropriate definition of the objective function. For example, instead of the bus-counters being simply the sum of the director-counters, it may be desirable to define the bus-counters as a weighted sum of the director-counters or as some other function of the director-counters.

In some cases, it may also be desirable to treat different resources from the same resource class differently. For example, one disk director may be assigned a higher priority than another disk director by weighting the counter for that disk director differently from counters of other disk directors.

A data-storage system 10 typically supports the mirroring of one disk onto another. When a host director 12 issues a write request for a mirrored disk, the data to be written (referred to as the "source data") is written to a first and second disk. Since a write to a disk is a time-consuming operation, it is desirable that the source data be written to the first and second disk in parallel. To the extent that the first and second disks share any common resources, this will not be possible.

In another embodiment, the disk-mapping utility 50 recognizes a set of mirrored disks and imposes the additional constraint that the resources shared by the disks in the set of mirrored disks be minimized. For example, the disk-mapping utility 50 can insure that no two disks from the set of mirrored disks share the same bus, or that no two disks from the set of mirrored disks share the same disk director.

Once the physical disks 22*a–p* have been connected to the appropriate strings, the next step in the configuration process is to allocate logical volumes 46 among the physical disks 22*a–p*. As discussed above in connection with FIG. 4, this can be viewed as the addition of the fifth node level 44 to the resource tree 34. The issues that arise in connection with allocating logical volumes 46 among the physical disks 22*a–p* are thus similar to those already discussed above in connection with the allocation of physical disks 22*a–p* among the disk directors 16*a–d* and their respective strings 20*a–h*.

The choice of which physical disk a logical volume resides on can affect the overall performance of the data-storage system 10. For example, if all logical volumes were to reside on the same physical disk, then there would be unnecessary contention for that physical disk. If the logical volumes were evenly distributed across the physical disks but all the physical disks were served by the same string, there would be unnecessary contention for that string. If the logical volumes were served by the same disk director, there would be unnecessary contention for that disk director. Finally, if the logical volumes were served by different disk directors, but all the disk directors were served by the same bus, there would be unnecessary contention for that bus.

The service processor 26 also maintains a second counter array 68 that includes counters indicating the number of logical volumes being served by each resource listed in the resource database 41. These counters are updated upon making a change to the distribution of logical volumes 46 among the physical disks 22*a–p*. These counters are distinct from the counters discussed above in connection with the first counter array 48.

In the context of FIG. 1, there exists a disk counter for each physical disk 22*a*, the value of which indicates the number of logical volumes residing on that physical disk, a string counter for each string 20*a*, the value of which is the sum of the counters for all physical disks 22*a*, 22*i* connected to that string 20*a*, a disk-director counter for each disk director 16a, the value of which is the sum of the counters of all strings 20a, 20e connected to that disk director 16d, and a bus counter for each bus 18b, the value of which is the sum of the counters for all disk directors 16a, 16b connected to that bus 18a.

For a given set of logical volumes, a volume-mapping utility 70 executed by the service processor 26 maps the logical volumes 46 onto the available physical disks 22a–p so as to equally distribute the load borne by all the hardware resources of the system.

FIG. 7 summarizes the method carried out by the volume mapping utility in determining on which physical disk a logical volume is to reside. The volume-mapping utility reads 72 the second counter array and inspects the bus counters to identify and select 74 the bus that serves the fewest logical volumes. Having selected a bus, the volume, mapping utility inspects the disk director counters associated with that selected bus to identify and select 76 the disk director on that bus that serves the fewest logical volumes. The volume-mapping utility then inspects the string counters associated with that disk director to identify and select 78 the string connected to that disk director that serves the fewest logical volumes. The volume-mapping utility then inspects the disk counters for all disks mounted on that string to identify 80 the physical disk on which the fewest logical volumes reside. Finally, the volume-mapping utility designates 82 that physical disk to be the residence of the logical volume.

After having designated the disk on which the logical volume is to reside, the volume-mapping utility then updates 84 the counters associated with all installed resources affected by the addition of the logical volume. The volume-mapping utility then determines 86 whether there are additional logical volumes to be assigned a residence. If so, the volume-mapping utility repeats the foregoing process. Otherwise, the volume-mapping utility generates 88 a configuration file used by the data-storage system 10 to associate a volume specified by a host 14 and a particular physical disk on which the volume resides.

The output of the volume-mapping utility 70 is a configuration in which the number of logical volumes serviced by any one resource differs by the number of logical volumes serviced by any other resource by no more than one. For example, in a properly configured data-storage system 10, if a particular disk director services n logical volumes, then all other disk directors will service either n, n+1, or n−1 logical volumes. An analogous statement can be made for the buses and the physical disks on a properly configured data-storage system 10.

Figure 8:
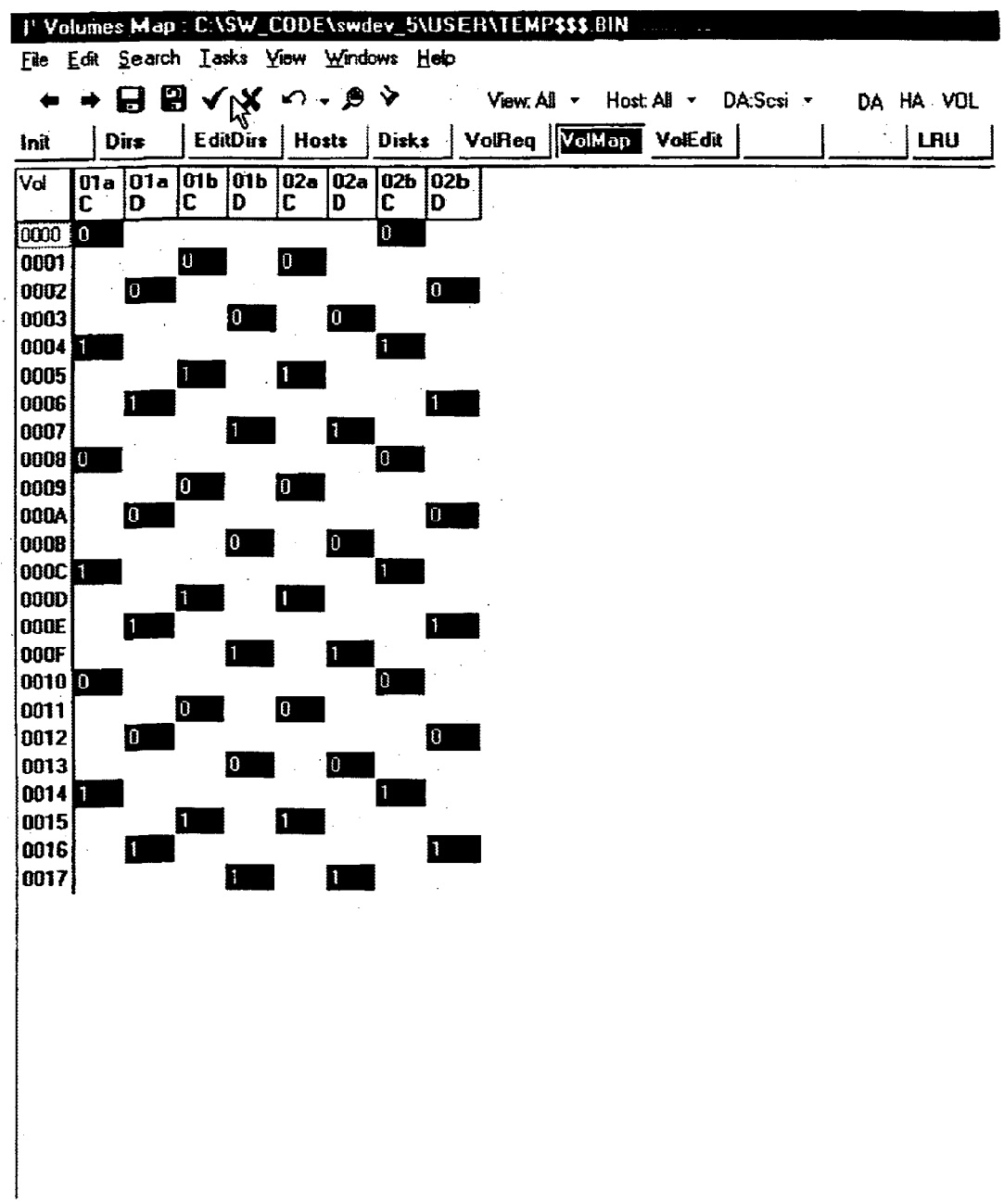
FIG. 8 shows representative graphical output of software for implementing the configuration system for allocating installed resources to logical volumes.

FIG. 8 is a graphical representation of that portion of the configuration file that maps logical volumes to disks. Each column in FIG. 8 corresponds to a string associated with a disk director. The nomenclature used in FIG. 8 identifies the resources used by each string. For example, the label on the left-most column, "01aC" indicates that this is the first string ("C") on the first disk director ("01") connected to the first bus ("a"). The label on the eight column "02bD" indicates that this column corresponds to the second string ("D") of the second disk director ("02") connected to the second bus "("b").

The twenty-four rows on the chart indicate the logical volumes that are to be mapped to a physical disk. The first column on the chart indicates that logical volume 0000 resides on the first physical disk ("0") of the first string ("01a C") connected to the first disk director ("01aC") and that this first disk director is connected to the first system bus ("01 aC"). Logical volume 0004 resides on a second physical disk ("1") connected to that same string.

FIG. 8 also shows the manner in which logical volumes are mirrored. For example, logical volumes 000F, 0003, 000B, and 0013 (the volumes are numbered in hexadecimal notation) are each resident on two physical disks: a first physical disk, mounted on the second string of disk adaptor 02aD, and on a second physical disk, mounted on the second string of disk adaptor 01bD. Note that this logical volume is mirrored on physical disks connected to different disk-directors and different buses. This reduces resource contention when a write is made to that logical volume and also when two host adaptors request data from the same logical volume.

Within the data-storage system 10, each logical volume is sequentially numbered, as shown in the first column of FIG. 8. The logical volumes assigned to a particular host 14 are typically blocks of consecutively numbered logical volumes. For example, in FIG. 8, logical volumes 0000 to 000B might be assigned to a first host, while logical volumes 000C to 0017 might be assigned to a second host. It is therefore desirable that logical volumes that reside on the same physical disk be as far apart on this sequence as possible.

By convention, even and odd-numbered disk directors connect to different system buses. Hence, a volume-mapping utility 70 according to the invention determines when two logical volumes are numerically adjacent to each other in the foregoing sequence. If two logical volumes are adjacent, the volume-mapping utility 70 ensures that the two logical volumes are resident on physical disks that are served by different directors and different buses.

FIGS. 1 and 9 together illustrate the mapping of twenty-four mirrored logical volumes to physical disks 22a–p in the data-storage system 10 of FIG. 1. As indicated by FIG. 1, each disk 22a has three partitions, each of which can be allocated to one logical volume. Hence, each disk 22a can accommodate up to three logical volumes.

As shown in FIG. 1, logical volumes 000–003 are mapped to the eight disks 22a–h on all strings 20a–h of successive disk directors 16a–d. This ensures load balancing by imposing the burden of servicing a logical volume among all available disk directors 16a–d and splitting the load among the two available buses 18a–b.

Beginning with logical volume 004, it becomes necessary to map logical volumes onto disk directors, buses, and strings that are already servicing one logical volume. Load balancing can be achieved in this case by mapping logical volumes 004–007 to the disks 22i–p. As a result, each disk 22a–p now has one resident logical volume.

For logical volumes 008–00F, it is no longer possible to find a string that has not been pressed into service. Nevertheless, load balancing can still be achieved by calling into service the second partition on each of the physical disks 22a–p. The pattern for mapping logical volumes 000–007 is thus repeated for logical volumes 008–00F.

Once logical volume 00F has been mapped, each available physical disk 22a–p will have two logical volumes resident. It therefore becomes necessary to use the third partition on each physical disk 22a–p. The pattern for logical volumes 000–00F is thus repeated for the remaining logical volumes 010–01F. The results in the load-balanced configuration shown in FIGS. 1, 8, and 9.

In one embodiment, the volume-mapping utility 70 identifies mirrored logical volumes and deviates from the above pattern to the extent necessary to avoid having a mirrored pair of logical volumes share resources. For example, in the context of FIGS. 9 and 10, if the volume-mapping utility 70 were to identify logical volumes 00 and 08 as a mirror pair, it may swap logical volumes 08 and 09 so that logical volumes 08 and 00 share neither the same disk director nor the same string.

Having described the invention, and a preferred embodiment thereof, what we claim as new and secured by letters patent is:

1. A computer-implemented method for automatically configuring a data-storage system, said method comprising:

receiving a specification of mass-storage elements to be incorporated into said data-storage system;

identifying installed hardware resources of said data-storage system available for sharing among mass-storage elements;

mapping each of said mass-storage elements to a subset of said installed resources, said subset being selected to equalize a load among said installed resources, said load arising as a result of incorporating said mass-storage elements into said data-storage system.

2. The method of claim 1, wherein receiving said specification comprises receiving information representative of a physical disk to be incorporated into said data-storage system.

3. The method of claim 1, wherein receiving said specification comprises receiving information representative of a logical volume to be incorporated into said data-storage system.

4. The method of claim 1, wherein mapping each of said mass-storage elements to a subset of said installed resources comprises selecting said subset of installed resources to minimize an extent to which any two mass-storage elements share a common resource.

5. The method of claim 1, further comprising displaying said subset of installed resources.

6. The method of claim 1, wherein identifying said installed resources comprises identifying a plurality of system buses available for carrying data to and from a mass-storage element.

7. The method of claim 6, wherein identifying said installed resources comprises identifying a plurality of disk directors available for controlling data communication between a mass-storage element and said data-storage system, each of said disk directors being connected to one of said system buses.

8. The method of claim 7, wherein identifying said installed resources comprises identifying a plurality of strings associated with said disk directors, each of said strings being available for mounting a mass-storage element.

9. The method of claim 1, wherein identifying said installed resources comprises classifying said installed resources into a plurality of resource classes; and allocating a subset of said installed resources to each of said mass-storage elements to minimize an extent to said mass-storage elements share installed resources within a resource class.

10. A configuration system for configuring a data-storage system, said configuration system comprising:

a resource database containing information indicative of installed resources allocable to a mass-storage element;

a data input for providing a specification of mass-storage elements to be incorporated into said data-storage system; and a mapping utility in communication with said data input and said resource database, said mapping utility configured to allocate said installed resources to said mass-storage elements to equalize a load among said installed resources, said load arising as a result of incorporating said mass-storage elements into said data-storage system.

11. The system of claim 10, wherein said mass-storage elements comprise at least one physical disk to be incorporated into said data-storage system.

12. The system of claim 10, wherein said mass-storage elements comprise at least one logical volume to be incorporated into said data-storage system.

13. The system of claim 10, wherein said mapping utility is configured to map each of said mass-storage elements to a subset of said installed resources, said subset of installed resources being selected to minimize an extent to which any two mass-storage elements share a common resource.

14. The system of claim 10, further comprising a user-interface for display of said subset of installed resources.

15. The system of claim 10, wherein said resource database includes information identifying a plurality of system buses available for carrying data to and from a mass-storage element and said mapping utility is configured to select a system bus from said plurality of system buses for allocation to a mass-storage element.

16. The system of claim 15, wherein said resource database includes information identifying plurality of disk directors available for controlling data communication between a mass-storage element and said data-storage system, each of said disk directors being connected to one of said system buses, and said mapping utility is configured to select a disk director from said plurality of disk directors for allocation to a mass-storage element.

17. The system of claim 16, wherein said resource database includes information identifying a plurality of strings associated with said disk directors, each of said strings being available for mounting a mass-storage element, and said mapping utility is configured to select a string from said plurality of strings for allocation to a mass-storage element.

18. The system of claim 10, wherein said mapping utility is configured to classifying said installed resources into a plurality of resource classes; and allocating a subset of said installed resources to each of said mass-storage elements to minimize an extent to said mass-storage elements share installed resources within a resource class.

19. A computer-readable medium having encoded thereon software for automatically configuring a data-storage system, said software comprising instructions for:

receiving a specification of mass-storage elements to be incorporated into said data-storage system;

identifying installed hardware resources of said data-storage system available for sharing among mass-storage elements;

mapping each of said mass-storage elements to a subset of said installed resources, said subset being selected to equalize a load among said installed resources, said load arising as a result of incorporating said mass-storage elements into said data-storage system.

* * * * *